United States Patent [19]

Lager

[11] 3,909,562

[45] Sept. 30, 1975

[54] SWITCHING NETWORK TESTING PROCESS AND ARRANGEMENT

[75] Inventor: Jean Paul Lager, La Celle St. Cloud, France

[73] Assignee: International Standard Electric Corporation, New York, N.Y.

[22] Filed: Sept. 12, 1974

[21] Appl. No.: 505,295

[30] Foreign Application Priority Data

Oct. 5, 1973 France ........................ 73.35679

[52] U.S. Cl. ...................... 179/175.2 R; 179/15 AT

[51] Int. Cl.$^{2}$ ...................... H04M 3/24; H04J 3/14

[58] Field of Search... 179/175.2 R, 175.2 C, 15 AT

[56] References Cited

UNITED STATES PATENTS

| | | | |
|---|---|---|---|
| 3,686,441 | 8/1972 | Thomas | 179/175.2 R |
| 3,705,958 | 12/1972 | Jacob | 179/15 AT |
| 3,760,107 | 9/1973 | Duerdoth et al. | 179/175.2 R |
| 3,760,115 | 9/1973 | Duerdoth et al. | 179/175.2 R |

*Primary Examiner*—Wiliam C. Cooper
*Assistant Examiner*—Douglas W. Olms
*Attorney, Agent, or Firm*—John T. O'Halloran; Menotti J. Lombardi, Jr.; Alfred C. Hill

[57] ABSTRACT

An arrangement to test the continuity of larger multistage time-space-time switching network includes means in response to input and output addresses of a speech channel to compare a speech sample derived at the incoming time division speech switch with a speech sample derived at the outgoing time division speech switch. If the compared samples are identical the continuity of the switching network is not faulty and the arrangement is advanced to check the continuity of the next speech channel.

10 Claims, 1 Drawing Figure

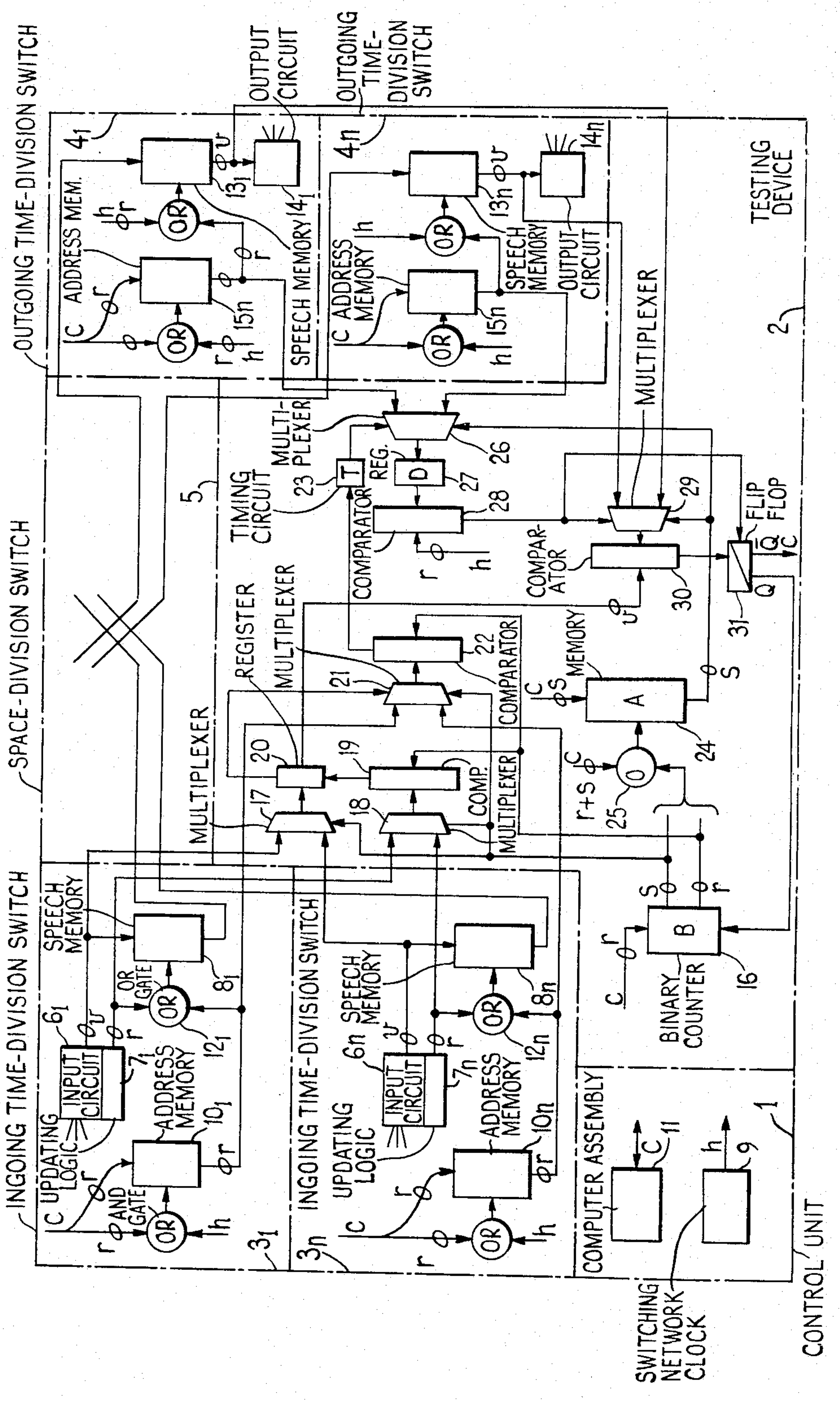
OUTGOING TIME-DIVISION SWITCH
OUTPUT CIRCUIT
OUTGOING TIME-DIVISION SWITCH
SPACE-DIVISION SWITCH
INGOING TIME-DIVISION SWITCH
TESTING DEVICE
MULTIPLEXER
MULTI-PLEXER
TIMING CIRCUIT
COMPARATOR
REGISTER
MEMORY
FLIP FLOP
BINARY COUNTER
COMPUTER ASSEMBLY
SWITCHING NETWORK CLOCK
CONTROL UNIT
SPEECH MEMORY
ADDRESS MEMORY
UPDATING LOGIC
INPUT CIRCUIT
OR GATE
AND GATE

SWITCHING NETWORK TESTING PROCESS AND ARRANGEMENT

BACKGROUND OF THE INVENTION

The present invention relates to a testing process and a device to carry out the process for a multistage time-division switching network.

Due to the complexity of switching operations in large multistage time-division switching networks, various tests must be made to ensure a good operation of the network. For instance, continuity of paths temporarily established for the various communications must be checked. Due to the discontinuous repetitive feature of the switching operations, tests in time-division switching have a much greater importance than in space-division switching.

A solution that is conventionally utilized in transmission problems is to compare data transmitted through the network with data stored before transmission. In the case of time-division switching networks and particularly large multistage time-space-time (TST) networks, the problem is complicated by the large number of possibilities of connections from inputs to outputs. Systematic testing of any possible connection from inputs to outputs is not easily possible to envisage during network operation due to random establishment of calls through the network.

Conventionally on establishing each new call a continuity test is made, but that is not satisfactory in time-division networks wherein any path is only established for the transmission duration of each sample and still less satisfactory in time-division networks comprising a space-division switching stage wherein space-division crosspoints may be utilized for several different paths during successive elementary times.

Thus there is more interest in systematically testing any established connection rather than any possible connection and keeping the capability to make any necessary test, if needed. However, in any case both ends of each connection must be known for possibly taking a sample before it is transmitted through the connection and taking this sample after it has been transmitted. Therefore, when considering *b* inputs and *b* outputs, this implies that their addresses may be temporarily stored. A cheap solution, however prohibiting any systematic test, consists in using two registers, each being able to store an address, provided that both input and output addresses for a connection are supplied from the network control computer assembly when establishing that connection. In such a condition a systematic test with sample taking cannot be envisaged when *b* is large.

A theoretical solution, that may be envisaged, consists in utilizing a memory comprising *b* rows, each row being able to store the *c* bits corresponding to addressing of an input (or an output) amongst *b* inputs (or outputs). This is very expensive when *b* is a large number. For instance, if *b* is approximately 15,000, a peculiar memory having 15,000 14-bit rows will be needed.

However, the time-division switching network has already either directly or indirectly stored addressing information in certain components thereof. Thus, there is no need to store the corresponding bits in a special memory.

SUMMARY OF THE INVENTION

Therefore, an object of this invention is the provision of a testing process and a device to carry out the process for multistage time-division switching network which permits making a rapid systematic test of any connection which has been established either for communication or possibly control purpose by using a special memory having reduced capacity.

A feature of the present invention is the provision of a testing process to test the operation of a multistage time-division switching network by comparing a sample transmitted through the switching network with the sample prior to the transmission comprising the steps of: storing an address of an outgoing time-division switch transmitting the sample from an ingoing time-division channel for each new connection established via the ingoing channel, the address including an input address of the ingoing channel of an ingoing time-division switch that receives the ingoing channel and a switch address of the ingoing switch; generating the switch address; storing a duplicate of the sample applied to data inputs of a speech memory in the ingoing switch having its address generated when a write address identical to the generated switch address is applied to inputs of the speech memory; detecting the occurrence of a read address identical to the generated switch address at addressing inputs of the speech memory in the ingoing switch having its switch address generated; delaying by a predetermined period following completion of the detecting step; storing a write address from a time-division address memory in the selected outgoing switch, the write address being provided from a special memory as a function of the generated switch address; the predetermined period being as long as the time of transmitting the sample through a space-division switch of the network; detecting the occurrence of a read address identical to the write address stored in the last mentioned storing step at addressing inputs of a speech memory of the selected outgoing switch; deriving a duplicate of the sample at the output of the speech memory of the selected outgoing switch when the last mentioned detecting step is completed; comparing the sample stored in the second above-mentioned storing step with the sample derived in the above-mentioned deriving step; and transmitting the results of the comparing step to appropriate circuits for initiating the process on another sample.

Another feature of this invention is the provision of a testing arrangement for a multistage time-division switching network comprising: a switching network control computer assembly; a control addressing means coupled to the assembly capable of providing for each control operation a binary input address of a sample from which a duplicate sample is derived for comparison purposes; first storage means coupled to the assembly to store in a special memory row an address of an outgoing time-division switch which is selected for transmitting the sample as soon as the address of the outgoing switch is provided from the assembly when establishing a communication connection involving the sample, the special memory row having the address of the sample input address; second storage means coupled to the control addressing means to store for the duration of a control operation a duplicate of the sample stored in an ingoing speech memory of an ingoing time-division switch addressed by the control addressing means at a time-division address identical to the address provided by the control addressing means; means for determining coupled to the outgoing switch, the determining means determining a time-division address of the sample in an outgoing speech memory of the outgoing switch transmitting the sample, the determining means being rendered operative after a predetermined period following a read addressing of an ingoing speech memory processing the sample so as to store for the remaining time of a particular control operation a time-division address memory of the outgoing switch transmitting the sample; comparison means coupled to the first and second storage means to compare the samples stored therein when the time-division address stored in the determining means is identical to the address provided from a clock; and translating means coupled to the comparison means and the control addressing means to increment the control addressing means in response to the output signal of the comparison means at the end of each control operation.

It must be understood that such a testing device is preferably associated with subsidiary arrangements, which will not be described herein, but which make it possible to locate a faulty component or components when a fault has been detected by the proper testing device.

BRIEF DESCRIPTION OF THE DRAWING

The above-mentioned and other features and objects of this invention and the manner of obtaining them will become more apparent by reference to the following description taken in conjunction with the drawing, the single FIGURE of which is a block diagram of a time-space-time switching network comprising a control device according to the principles of this invention.

DESCRIPTION OF THE PREFERRED EMBODIMENT

The FIGURE shows an example of time-division switching network of the TST type used in an exchange including the exchange control unit 1 and the testing device 2 according to the principles of this invention.

The switching network comprises an ingoing stage including $n$ ingoing time-division switches 3, such as $3_1$ and $3_n$, an outgoing stage preferably also including $n$ outgoing time-division switches 4, such as $4_1$ and $4_n$, and a space-division switch 5 connected from ingoing time-division stage to outgoing time-division stage. The space-division switch 5 may comprise one or several stages so arranged as to provide a correct service between ingoing and outgoing time-division stages, according to processes well known to people skilled in the art.

Every ingoing time-division switch conventionally comprises a speech memory 8, a time-division address memory 10 and a switching interface including an input circuit 6 and an updating logic circuitry 7. In any switch 3 input circuit 6 receives any ingoing speech sample through one of the $p$ channels belonging to one of the $q$ ingoing junctions connected thereto in a known manner, not shown, each serially received sample being multiplexed and parallel transmitted from circuit 6 to speech memory 8 associated to the involved switch 3.

In any switch updating logic circuitry 7 ensures that samples ingoing through associated input circuit 6 are updated with reference to the switching network clock 9 which it is connected to in a known manner, not shown. Updating logic circuitry 7 also provides the address at which any ingoing sample must be stored in the switch speech memory 8. That address comprises $r$ bits in the described embodiment, the relation $2^r = p.q$ being preferably verified. In a switch time-division memory 10 provides read addressing for speech memory 8. Memory 10 is loaded and addressed in write operation by computer assembly 11 which is in charge of the switching network control, and is addressed in read operation by network clock 9.

Any sample from a speech memory 8 is transmitted to an outgoing time-division switch 4 through the switching network space-division switch 5, and more particularly to the speech memory 13 in the selected switch 4. Conventionally any switch 4 comprises a speech memory 13, a time-division address memory 15 and an output circuit 14 connected to each of the outgoing junctions.

In a switch 4 speech memory 13 provides time-division switching for outgoing samples. In write operation speech memory 13 is addressed by the associated time-division address memory 15 while in read operation it is addressed by network clock 9. Output circuit 14 serially transmits each sample received in parallel from the associated speech memory 13 so as to send that sample through one of the channels belonging to one of the associated outgoing junctions, not shown.

Testing device 2 comprises test addressing means which basically includes a binary counter 16 that is capable to sequentially provide n.p.q different input addresses. Each input address comprises $r + s$ bits with preferably $2^s = n$. Binary word $r$ corresponds to the address associated to a channel in an outgoing time-division switch while word $s$ corresponds to the address associated to an ingoing time-division switch.

Binary counter 16 may be so preset by computer assembly 11 as to deliver a predetermined address for a test operation. It also has an incremental input permitting the shift from one address to the next following address in a selected binary logic order so as to permit to shift from one test operation to the next test operation to provide systematic testing of all the network.

Thus, generating a given input address from the output of counter 16 results in selecting a specific channel in a specific junction in a specific ingoing time-division switch in the switching network.

To derive a sample from the channel determined by an input address, device 2 includes storage means capable to sort only those samples delivered from the ingoing time-division switch 3 whose address is supplied from counter 16 and among those samples to sort the sample from the channel whose address is supplied from counter 16.

Accordingly storage means comprises two logic multiplexers 17 and 18, a comparator 19 and a register 20. In fact multiplexer 17 has as many units as sample bits, i.e. $v$ units, and multiplexer 18 has as many units as time-division address bits, i.e. $r$.

Comparator 19 receives in parallel, on the one hand, from counter 16 those $r$ bits corresponding to the selection of a channel among the p.q channels in each switch 3 and, on the other hand, $r$ bits from the $r$ outputs of multiplexer 18. Data inputs of multiplexer 18 are respectively connected to outputs of the $n$ updating logic circuitry 7 which supply sample write addresses to speech memory 8. Addressing inputs of multiplexer 18 are connected from the $s$ outputs of counter 16 which deliver the $s$ bits corresponding to the selection of a switch 3 among $n$ switch so as to allow transmission of that data which only corresponds to the time-division address of a sample which is delivered from only the switch addressed by counter 16 at a predetermined time, the input address delivered by counter 16 being unchanged for the test operation duration concerning a sample. Thus, at each network elementary time there is a comparison of sample time-division address supplied from updating logic circuitry 7 of switch 3 addressed by counter 16 with the $r$ bits supplied to comparator 19 from counter 16. When agreement occurs between the supplied time-division address and the word of $r$ bits, comparator 19 operates register 20 which, in the described embodiment, can store a sample. Data inputs of register 20 are connected from outputs of multiplexer 17 and at that time store output data of multiplexer 17. Data inputs of multiplexer 17 are connected from outputs of the $n$ input circuits which transmit speech samples to associated speech memories 8. Addressing inputs of multiplexer 17 are connected from those $s$ outputs of counter 16 which deliver the $s$ bits corresponding to the selection of a switch 3 among $n$ switches so as to allow the transmission of those samples which are delivered from the addressed switch 3 only. Among those samples, only that sample which occurs when register 20 is operative is stored. Indeed that sample, hereafter called test sample, corresponds to the sample to be derived since it is known that the time-division address of a sample stored in speech memory 8 occurs from updating logic circuitry 7 associated thereto when that sample is transmitted from the associated input circuit 6.

In a known manner the reading of a sample from speech memory 8 is initiated by the associated time-division address memory 10 and occurs after a predetermined delay following the writing thereof into memory 8. As a result sample transmission through space-division switch 5 up to the concerned outgoing speech memory 13 is only initiated by reading from memory 8. In order to be able to derive a sample from outgoing speech memory 13, it is necessary to know the elementary time corresponding to reading thereof from memory 8, the transmission duration through space-division switch 5 to memory 13 and the time of reading from memory 13.

Accordingly device 2 comprises means for determining the elementary time of the reading of the sample from memory 8, which includes a multiplexer 21 and a comparator 22. Comparator 22 receives in parallel, on the one hand, from counter 16 the $r$ bits corresponding to the selection of a channel among the p.q. channels of each switch 3 and, on the other hand, the $r$ bits from the $r$ outputs of multiplexer 21 identical to multiplexer 18.

Data inputs of multiplexer 21 are connected to outputs of the $n$ time-division address memory 10 which supply sample reading addresses to speech memory 8. Addressing inputs of multiplexer 21 are connected from the $s$ outputs of counter 16 which deliver the $s$ bits corresponding to the selection of a switch 3 among $n$ switches.

In such a manner there are transmitted from multiplexer 21 to comparator 22 only those addresses of a switch having received the test sample, the duplicate of which is stored in register 20. The address output of multiplexer 21 coupled to comparator 22 is identical to the address output delivered from counter 16 and corresponds to announcing the transmission of the test sample from the concerned memory 8 for the concerned test operation.

As a result of knowing the elementary time when the concerned test sample is read from speech memory 8 and of knowing the sample transit time duration through space-division switch 5, the write time of the concerned sample in the outgoing speech memory may be known. Therefore, device 2 comprises a timing circuit 23 connected from output of comparator 22. Circuit 23 delays by a time duration $t$ the output from comparator 22, $t$ being equal to the number of elementary times needed for transmission through space-division switch 5 and is longer than one elementary time, particularly in the case of a transmission requesting sequential operations.

For receiving the address of the outgoing switch 4 receiving the transmitted test sample, device 2 comprises storage means for storing the address of that switch 4 when it is provided to the concerned circuits from computer assembly 11. Such storage means comprise a memory having as many rows as outgoing junction channels in the switching network, that is n.p.q. rows in the described embodiment. Each row can store in memory 24 the bits corresponding to the address of an outgoing time-division switch 4, i.e. $n$ bits for example. In the write operation memory 24 is addressed and loaded by computer assembly 11 when a communication is established. It is erased by the same computer assembly 11 at the end of the communication. In the read operation memory 24 is addressed by counter 16 which sends to it the $r + s$ bits of an input address for each test operation concerning a sample.

For knowing the address of a test sample in outgoing speech memory 13, the time-division address from time-division address memory 15 in the concerned outgoing switch 4 is stored, such a time-division address being available during the elementary time during which the test sample is written into speech memory 13.

Accordingly control device 2 comprises detection means including a multiplexer 26 similar to multiplexers 18 and 21. Data inputs of multiplexer 26 are connected from outputs of the $n$ time-division address memories 15 which deliver sample read addresses to speech memories 13. Addressing inputs of multiplexer 26 are connected from the $s$ outputs of memory 24 which deliver the $s$ bits corresponding to the selection of an outgoing switch 4 among $n$ outgoing switches. The activation input of multiplexer 26 is connected from the output of timing circuit 23. Thus, occurrence of input address from counter 16 results in occurrence of a $s$-bit word from memory 24 and addressing of the so determined outgoing switch. That addressing applied to multiplexer 26 insures that the addresses delivered by the addressed outgoing switch 4 can only be transmitted. Among those addresses, the address occurring when the activation input of multiplexer 26 is correctly actuated will actually be transmitted, that is, the address occurring at the elementary time following by a delay $t$ when the considered test sample from memory 8 is present.

Device 2 provides resistor 27 to store the address delivered by the activated multiplexer 26, that storage being valuable for the duration of the test operation.

The test sample is derived at output of speech memory 13 so as to check the entire sample path through the switching network. Accordingly the testing device 2 includes a comparator 28 and a multiplexer 29.

Comparator 28 receives, on the one hand, the *r* bits which constituted the outgoing time-division address stored in register 27 and, on the other hand the *r* bits provided from network clock 9 to speech memories 13 for the read operation at each elementary time. Thus, the occurrence of a test sample from the output of speech memory 13 is detected by comparator 28 which renders multiplexer 29 operative. Multiplexer 29 is identical to multiplexer 26. Data inputs of multiplexer 29 are connected from output of the *n* outgoing speech memories 13 which deliver output samples to output circuits 14. The addressing inputs of multiplexer 29 are connected to the *s* outputs of memory 24 and the activation input multiplexer 29 is connected to comparator 28. Thus, only the transmission of the sample outgoing from speech memory 13 of switch 4 is allowed whose address is delivered by memory 24 for the given test operation when comparator 28 has recognized the address stored in resistor 27, that is, the address which is normally assigned to the test sample for the specific test operation.

Comparator 30 provides comparison of the sample transmitted by multiplexer 29 with the sample stored in register 20. If the two samples are identical, comparator 30 activates a flip flop 31 which shifts counter 16 by one step and consequently initiates the test of the sample corresponding to the next time-division channel in the switching network. When the two samples are not identical various test procedures may be initiated with the aid of the computer assembly in a manner which will not be further described since it is out of the scope of this invention.

It should be noted that the speech samples to be compared may be replaced by test samples inserted into the ingoing speech memory in an appropriate manner.

While I have described above the principles of my invention in connection with specific apparatus it is to be clearly understood that this description is made only by way of example and not as a limitation to the scope of my invention as set forth in the objects thereof and in the accompanying claims.

I claim:

1. A testing process to test the operation of a multistage time-division switching network by comparing a sample transmitted through said switching network with said sample prior to said transmission comprising the steps of:

storing an address of an outgoing time-division switch transmitting said sample from an ingoing time-division channel for each new connection established via said ingoing channel, said address including an input address of said ingoing channel of an ingoing time-division switch that receives said ingoing channel and a switch address of said ingoing switch;

generating said switch address;

storing a duplicate of said sample applied to data inputs of a speech memory in said ingoing switch having its address generated when a write address identical to said generated switch address is applied to inputs of said speech memory;

detecting the occurrence of a read address identical to said generated switch address at addressing inputs of said speech memory in said ingoing switch having its switch address generated;

delaying by a predetermined period following completion of said detecting step;

storing a write address from a time-division address memory in said selected outgoing switch, said write address being provided from a special memory as a function of said generated switch address;

said predetermined period being as long as the time of transmitting said sample through a space-division switch of said network;

detecting the occurrence of a read address identical to said write address stored in said last mentioned storing step at addressing inputs of a speech memory of said selected outgoing switch;

deriving a duplicate of said sample at the output of said speech memory of said selected outgoing switch when said last mentioned detecting step is completed;

comparing said sample stored in the second above-mentioned storing step with said sample derived in said above-mentioned deriving step; and transmitting the results of said comparing step to appropriate circuits for initiating said process on another sample.

2. A testing arrangement for a multistage time-division switching network comprising:

a switching network control computer assembly;

a control addressing means coupled to said assembly capable of providing for each control operation a binary input address of a sample from which a duplicate sample is derived for comparison purposes;

first storage means coupled to said assembly to store in a special memory row an address of an outgoing time-division switch which is selected for transmitting said sample as soon as said address of said outgoing switch is provided from said assembly when establishing a communication connection involving said sample, said special memory row having said address of said sample input address;

second storage means coupled to said control addressing means to store for the duration of a control operation a duplicate of said sample stored in an ingoing speech memory of an ingoing time-division switch addressed by said control addressing means at a time-division address identical to the address provided by said control addressing means;

means for determining coupled to said outgoing switch, said determining means determining a time-division address of said sample in an outgoing speech memory of said outgoing switch transmitting said sample, said determining means being rendered operative after a predetermined period following a read addressing of an ingoing speech memory processing said sample so as to store for the remaining time of a particular control operation a time-division address memory of said outgoing switch transmitting said sample;

comparison means coupled to said first and second storage means to compare said samples stored therein when the time-division address stored in said determining means is identical to the address provided from a clock; and translating means coupled to said comparison means and said control addressing means to increment said control addressing means in response to the output signal of said comparison means at the end of each control operation.

3. An arrangement according to claim 2, wherein said control addressing means includes a binary counter coupled to said assembly and said translation means providing each of the different possible sample input addresses in said network, said counter being presettable by said assembly so as to deliver a predetermined input address and to be incremented step by step by said translation means at the end of each control operation so as to deliver for the next control operation an appropriate input address.

4. An arrangement according to claim 3, wherein said first storage means includes a memory coupled to said assembly and said control addressing means having as many rows as ingoing time-division channels in said network, each of said rows having a different input address which in write operation is delivered by said assembly and in read operation is delivered by said control addressing means, each of said rows being capable of storing the address of said outgoing switch which is supplied by said assembly.

5. An arrangement according to claim 4, wherein said second storage means includes a first multiplexer coupled to said counter and ingoing updating circuits in said ingoing time-division switches, said first multiplexer being addressed by said counter output assigned to an address of said ingoing switch involved in a test operation and having data inputs from a selected one of said ingoing updating circuits so as to allow transmission of a time-division address from said ingoing switch addressed by said counter for said test operation, a second multiplexer coupled to said counter and input circuits of said ingoing switches, said second multiplexer being addressed by said counter output assigned to an address of said ingoing switch involved in a test operation and having data inputs from a selected one of said input circuits in parallel with an associated one of said ingoing speech memories so as to allow transmission of said sample only from said selected one of said input circuits addressed by said counter for said test operation, a first comparator coupled to outputs of said counter assigned to the time-division address of said sample concerned with said test operation and to the output of said first multiplexer so as to deliver a specific signal when detecting an address from said first multiplexer identical to an address delivered by said counter, and a first storage register coupled to said first comparator and said second multiplexer activated by said specific signal so as to store for the duration of said test operation said sample transmitted by said second multiplexer when it occurs.

6. An arrangement according to claim 5, wherein said determining means includes a first arrangement coupled to said ingoing switches, said counter and said storage register for determining the read time of said sample from said ingoing speech memory, a second arrangement coupled to said memory and said outgoing switches for determining the read time of said sample from said outgoing speech memory, and a timing circuit coupled between said first and second arrangements.

7. An arrangement according to claim 6, wherein said first arrangement includes a third multiplexer coupled to said counter and a time-division ingoing address memory in each of said ingoing switches, said third multiplexer being addressed by said counter output assigned to an address of said ingoing switch involved in said test operation and having data inputs connected to said ingoing address memories so as to allow transmission of only that address from said ingoing address memory addressed by said counter for said test operation, and a second comparator coupled to said third multiplexer and to the outputs of said counter assigned to the time-division address of said sample involved in said test operation so as to deliver a specific transmission signal when detecting an address from said third multiplexer identical to an address delivered by said counter.

8. An arrangement according to claim 7, wherein said timing circuit delays said specific transmission signal by a time delay equal to the transmission time of said sample through a space-division switch of said network.

9. An arrangement according to claim 8, wherein said second arrangement includes a fourth multiplexer coupled to said memory, said outgoing switches and said timing circuit, said fourth multiplexer being addressed by said memory, activated by said specific transmission signal and having data inputs coupled to a time-division address memory of said outgoing switch involved in said test operation to deliver the time-division address of said sample at the time of arrival of said sample in said involved outgoing switch, a second storage register coupled to said fourth multiplexer to store said time-division address delivered by said fourth multiplexer, and a third comparator coupled to the output of said second register and to addressing outputs of a network clock so as to deliver a predetermined signal when detecting a time-division address from said second register identical to a time-division address from said network clock.

10. An arrangement according to claim 9, wherein said comparison means includes a fifth multiplexer coupled to said memory said third comparator and said outgoing switches, said fifth multiplexer being addressed by said memory, activated by said predetermined signal and having data inputs coupled to said outgoing speech memories connected in parallel to time-division output circuits of said outgoing switches so as to allow transmission of said samples from said outgoing memory addressed by said memory for said test operation when said fifth multiplexer is operative, and a fourth comparator coupled to said first storage register and to said fifth multiplexer to provide at least a fault detection signal in the case of a difference between said samples present in said first storage register and in said fifth multiplexer.

* * * * *